United States Patent [19]

Edwards et al.

[11] 4,137,265

[45] Jan. 30, 1979

[54] WATER-INSOLUBLE NITROGEN-CONTAINING POLYOLS

[75] Inventors: Gayle D. Edwards, Nederland; Doris M. Rice, Austin; Robert L. Soulen, Georgetown, all of Tex.

[73] Assignee: Texaco Development Corporation, New York, N.Y.

[21] Appl. No.: 110,599

[22] Filed: Jan. 28, 1976

Related U.S. Application Data

[63] Continuation-in-part of Ser. No. 682,560, Nov. 13, 1967, abandoned, which is a continuation-in-part of Ser. No. 288,474, Jun. 17, 1963, abandoned.

[51] Int. Cl.$^2$ .............................................. C07C 87/28
[52] U.S. Cl. .................................. 260/570.9; 521/167
[58] Field of Search ....................................... 260/570.9

[56] References Cited

U.S. PATENT DOCUMENTS

| 2,998,452 | 8/1961 | Bruton et al. ..................... 260/570.9 |
| 3,297,597 | 1/1967 | Edwards et al. ............. 260/570.9 X |

*Primary Examiner*—Robert V. Hines
*Attorney, Agent, or Firm*—James L. Bailey

[57] ABSTRACT

A group of water-insoluble nitrogen-containing polyols is provided which are capable of self-catalyzed reaction with organic polyisocyanates to form rigid polyurethane foams of excellent dimensional strength. The polyols of this group are prepared by reacting from 2 to 3 mols of propylene oxide with one mol of the Mannich reaction product of a mol of phenol or nonylphenol with one or two mols of diethanolamine.

1 Claim, No Drawings

WATER-INSOLUBLE NITROGEN-CONTAINING POLYOLS

This application is a continuation-in-part of our co-pending application Ser. No. 682,560 which was filed on Nov. 13, 1967 and now abandoned as a continuation of our application Ser. No. 288,474, filed June 17, 1963 and now abandoned. U.S. Pat. No. 3,297,597 has issued as a division of our last-named application.

Our presently claimed invention is the provision of a particular class of nitrogen-containing polyols which possess certain outstanding advantages when used in the production of polyurethane foams as will be hereinafter more fully described.

It is known to prepare rigid polyurethane foams by the reaction of a polyisocyanate with a hydroxyl-terminated polyester or poly(oxyalkylene)ether having a hydroxyl number within the range of from about 350 to about 900. However, no ideal polyol has been found and, for various reasons, polyurethane foams prepared to date have not been entirely satisfactory.

For example, the resistance of rigid polyurethane foams to conditions of high temperature and high humidity has left much to be desired. As a further example, for many polyurethane applications it is necessary to have a foam which is either self-extinguishing or substantially noncombustible, and to provide these properties it is necessary to add extraneous fire retardants such as organic phosphorus compounds. Unfortunately, extraneous fire retardant compounds are normally required in an amount such that the final qualities of the polyurethane foam are adversely affected.

Still further, the production of a satisfactory urethane foam requires that the relative rates of the various reactions that occur be properly balanced. This balance is normally obtained by careful selection of a catalyst system. The catalyst usually consists of a tertiary amine used alone or, when necessary, mixed with organic tin compounds in a manner well known to those skilled in the art. The tertiary amines so employed will normally impart an objectionable amine odor to the final foam product.

It has now been discovered that many of the above-described disadvantages of urethane foams can be overcome by the use of novel nitrogen-containing polyols having a sufficient catalytic activity such that no extraneous catalyst is necessary for the production of rigid foam. Quite surprisingly, the rigid polyurethane foam prepared from polyols of the present invention is characterized by greater ease of fire retardancy and good dimensional strength when extraneous fire retardants are employed. In addition, the amine odor often associated with rigid urethane foams is not present in the instant foams.

Polyols which possess these and other beneficial properties when used in preparing polyurethane foams are the water-insoluble compounds of the formula

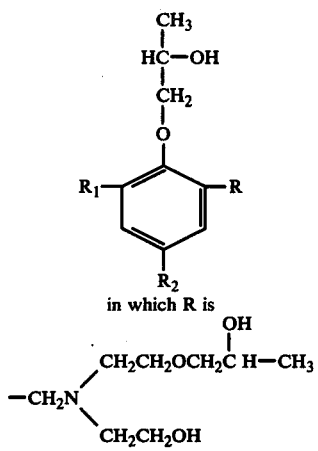

in which R is $$-CH_2N \begin{array}{c} CH_2CH_2OCH_2\overset{OH}{\underset{|}{C}}H-CH_3 \\ CH_2CH_2OH \end{array}$$

$R_1$ is hydrogen or R, and $R_2$ is hydrogen, R or the nonyl radical $-C_9H_{19}$. They are, therefore, either the reaction product of two mols of propylene oxide with a Mannich reaction product of one mol of phenol or para-nonylphenol, one mol of diethanolamine and one mol of formaldehyde or, where $R_1$ is the same as R, the reaction product of three mols of propylene oxide with the Mannich reaction product of one mol of phenol or para-nonylphenol with two mols of diethanolamine and two mols of formaldehyde. In the preferred compounds of our invention $R_1$ is hydrogen when $R_2$ is hydrogen but is the same as R when $R_2$ is the nonyl radical.

These preferred compounds possess the important advantage, as compared with other condensation products of the same type, that the number and location of the hydrophilic hydroxypropyl ether groups in their molecules are such that they are water-insoluble but still have an optimum hydrophile-hydrophobe balance for the formation of linear polyurethane molecules of maximum strength. Thus in one preferred species each molecule of phenol ($C_6H_5OH$) carries a single diethanolaminomethyl substituent and is reacted with only two mols of propylene oxide; it therefore has the structure:

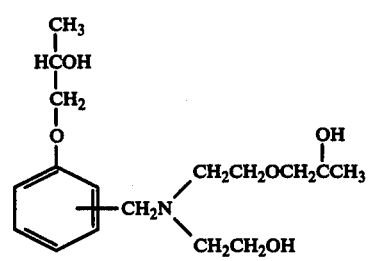

in which the methylamino group is ortho or para to the phenolic group and in most cases is a mixture of the two. This is true because the Mannich reaction ordinarily produces a mixture.

In a second preferred species of the invention a para-nonylphenol is combined. In order to counterbalance its more strongly hydrophobic character each molecule of this nonylphenol carries two diethanolaminomethyl substituents, each of which is etherified with a single propylene oxide molecule, as well as a propylene oxide residue attached at its phenolic hydroxyl group. Its structure is therefore as follows:

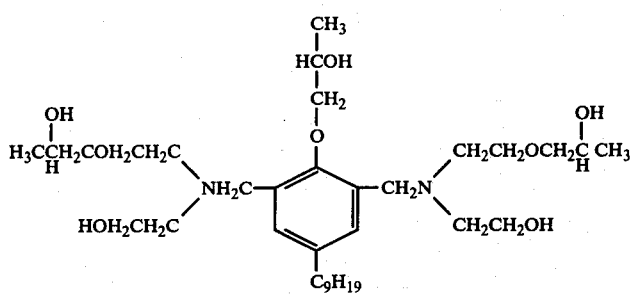

The Mannich reaction by which the diethanolaminomethyl-substituted phenols are produced is a well-known reaction wherein an active hydrogen compound is reacted with formaldehyde and a primary or secondary amine to produce a substituted aminomethyl derivative of the active hydrogen starting material. The Mannich reaction products used in preparing the above-defined compounds of our present invention are prepared by premixing one mol of the phenol or nonylphenol with one or two mols of the diethanolamine and then slowly adding the requisite quantity of formaldehyde at a temperature below the temperature of Novolak formation. The ortho and para positions of these phenolic compounds are sufficiently reactive to enter into the Mannich reaction. At the end of the formaldehyde addition, the reaction mixture is slowly heated with agitation to a temperature of at least about 50° C., such as a temperature within the range of about 80° C. to about 150° C., for a period of time sufficient to reduce the formaldehyde content to at most about 1 wt. %. This will require normally from about two to about four hours reaction time at the elevated temperature.

The formaldehyde may be employed in any of its conventional forms, such as aqueous formalin solution, an inhibited methanol-containing solution, para-formaldehyde or trioxane.

At the end of the reaction, water is stripped from the reaction mixture. The resulting crude Mannich reaction product may, without further purification, be condensed with propylene oxide in the manner hereinafter described, although it is preferably first purged with nitrogen at reduced pressure. If desired the reaction product may be separated into specific components or fractions, but products obtained by reacting the entire Mannich reaction product with an appropriate quantity of propylene oxide are included within the scope of our presently claimed invention.

The condensation with propylene oxide is carried out simply by introducing the propylene oxide, preferably under pressure, into a vessel containing the Mannich reaction product. No added catalyst is needed since the basic nitrogen in this product provides sufficient catalytic activity to promote the reaction. Temperatures between about 30° C. and about 200° C. may be employed but the preferred temperatures are in the range of about 90° to 120° C. Under these conditions the phenolic hydroxyl group reacts first with one mol of the propylene oxide after which the remaining one or two mols reacts with the alcoholic hydroxyls to form hydroxypropoxyethyl groups. The final condensation products are purified from unreacted and partially reacted materials by vacuum stripping and are obtained as clear amber to brown liquids having hydroxyl numbers in the range of 440 to 550 and viscosities between about 25,000 and 45,000 centipoises at 25° C.

As hereinbefore stated, the polyols of the present invention offer many advantages in the preparation of rigid polyurethane foams. Although a polyurethane foam may be prepared from a polyol component consisting entirely of a polyol of the present invention, it may be desirable to employ a polyol component containing from about 30 to about 100 wt. % of a polyol of the present invention, with the remainder being a conventional polyol normally used to prepare rigid urethane foams. Many examples of such polyols are known to those skilled in the art and may include those prepared by the reaction of an alkylene oxide selected from the group consisting of ethylene oxide, propylene oxide, 1,2-butylene oxide, styrene oxide, epichlorhydrin, glycidol and mixtures thereof with a polyhydric compound selected from the group consisting of carbohydrates and aliphatic and aromatic compounds containing from about three to about eight hydroxyl groups, such as hexanetriol, pentaerythritol, sorbitol, methyl glucoside, sucrose, 1,3,3-tris(hydroxypropoxyphenyl)propane, etc. In addition, alkylene oxide adducts of certain amines such as, for example, propylene oxide adducts of ethylenediamine, aminoethylpiperazine, etc., may be used. Certain hydroxy-terminated polyesters are also used to prepare rigid urethane foams. These are usually prepared from dibasic acids such as phthalic and adipic acids and diols or triols such as, for example, diethylene glycol, glycerine, trimethylolpropane, etc.

In preparing foams from the instant polyols, conventional foam preparation procedures are used with the exception that a catalyst is not needed. Polyisocyanates, blowing agents, foam stabilizers and fire-retardants useful in the preparation of rigid polyurethane foams are well known to those skilled in the art. Such components are described, for example, by Frisch et al in an article entitled "Advances in Technology and Uses of Rigid Urethane Foams" (Modern Plastics 40, 165 [October, 1962]).

In the quasi-prepolymer process, the quasi-prepolymer is prepared by the reaction of a large molar excess of a polyisocyanate with a polyol. This quasi-prepolymer is then further reacted with additional polyol and other foam components at the time of foaming. In the one-shot process, the foam components are mixed all at once.

If the quasi-prepolymer method is used to prepare rigid urethane foam in accordance with the present invention, it is preferred that the quasi-prepolymer be prepared by reacting a conventional polyol of the type above described with an amount of polyisocyanate sufficient to provide from about 20 to 40 wt. % of free isocyanato groups (based on the total amount of polyisocyanate used) in the quasi-prepolymer reaction product. An amount of the polyol of the present invention sufficient to provide about one hydroxyl group per free isocyanato group in the quasi-prepolymer is then added to the quasi-prepolymer in the presence of a foam stabilizer, a blowing agent and in some cases a fire retardant.

The most commonly used foam stabilizers are silicone oils, usually silicone-glycol copolymers. Examples of silicone foam stabilizers are those sold under the trade names of SF-1066, DC-113 and L-520. Blowing agents used to prepare urethane foams are described in the U.S. Pat. No. 3,072,582. Blowing agents are generally volatile liquids such as, for example, trichlorofluoromethane. Fire retardants that can be incorporated in the foaming mixture are of two types — those that are incorporated by mere mechanical mixing and those that become chemically bound in the polymer chain. The most commonly used of the first type are tris(chloroethyl)phosphate, tris(2,3-dibromopropyl)phosphate, diammonium phosphate, various halogenated compounds and antimony oxide. The second type fire retardant probably offers the best approach to the problem of fire retarding foams. Examples of this type fire retardant include chlorendic acid and various phosphorus-containing polyols.

Although the presence of an amine catalyst such as triethylenediamine, triethylamine, dimethylpiperazine, etc., is normally required to prepare an acceptable polyurethane foam, it is an advantage of the present invention that such an amine catalyst is not necessary. If a faster rise time or tack-free time is desired, one of the above-described amine catalysts may be added.

The organic polyisocyanate is suitably an organic aromatic or aliphatic polyisocyanate such as 3,3'-dichloro-4,4'-biphenyl diisocyanate, diphenyl diisocyanate, ethylene diisocyanate, propylene-1,2-diisocyanate, 1,4-tetramethylene diisocyanate, p-phenylene diisocyanate, 2,4- and 2,6-toluene diisocyanates, o,o'-, o,p'- and p,p'-diphenylmethane diisocyanates, hexamethylene diisocyanate, polymethylene polyphenylisocyanate, and mixtures thereof.

The invention will be further described and illustrated by the following specific examples. As a supplement to these examples we also refer to our U.S. Pat. No. 3,297,597 dated January 10, 1967, the disclosure of which is incorporated herein by reference.

EXAMPLE 1

A 3-liter flask was charged with 941 grams (10.0 mols) of phenol and 1,051 grams (10.0 mols) of diethanolamine. This mixture was cooled by means of an ice bath to 16° C., and 1,204 grams (15.0 mols) of 37% formaldehyde solution was added with stirring between 16° and 25° C. The mixture was stirred for one hour at 30° C., then heated to 95° C. for five hours. The reaction mixture was then heated at 95° to 100° C. under vacuum for a total of nine hours. The final product was then stripped at a pressure of less than 1 mm. yielding 2,173 grams of a very viscous material. This product (2,100 grams) was reacted with 1,314 grams of propylene oxide at 110° C. and 60 psig. until no pressure drop occurred. The propylene oxide adduct was stripped at 100° C. and less than 1 mm. pressure to yield a polyol having a hydroxyl number of 533.

EXAMPLE 2

A 5-gallon kettle was charged with 9.41 lbs. (0.1 lb. mol) of phenol and 10.51 lbs. (0.1 lb. mol) of diethanolamine. The mixture was maintained at a temperature of 35° C. under a nitrogen atmosphere while 8.04 lbs. (0.1 lb. mol) of a 37% formaldehyde solution was added slowly with agitation. After the formaldehyde addition, the mixture was stirred at room temperature for one hour, then heated to 95° C. for an additional two hours. The reaction mixture was then purged with gas at 95° C. and 3 mm. pressure. To the resulting Mannich base was added 11.6 lbs. (0.2 lb. mol) of propylene oxide at 95° C., followed by digestion of the mixture at 110° C. for 0.5 hour. The reaction mixture was then vacuum stripped to yield a light amber colored, viscous liquid having a hydroxyl number of 531 and viscosity of 30,000 cps. at 25° C.

EXAMPLE 3

A 5-gallon kettle was charged with 8.00 lbs. (38.5 mols) of phenol and 17.87 lbs. (77.1 mols) of diethanolamine. The kettle was evacuated and purged with nitrogen prior to the addition of 13.64 lbs. (77.1 mols) of 37% formaldehyde solution which was added with agitation while the reaction temperature was not allowed to rise above 35° C. After completion of the formaldehyde addition, the mixture was stirred at 35° C. for one hour, then heated at 90° C. for four hours. The Mannich base was stripped under vacuum with a nitrogen purge at 90° C. Propylene oxide (18.44 lbs., 144.3 mols) was then added at 90° to 110° C. and 60 psig. The propoxylated product was stripped to yield 42.57 lbs. of a polyol having a hydroxyl number of 561 and a viscosity of 38,800 cps. at 25° C. In this example four mols of propylene oxide per mol of phenol were combined; the adverse effect of this will be shown in Example 5.

EXAMPLE 4

A jacketed reaction kettle was charged with 24 pounds (0.1 lb. mol) of paranonylphenol and 22 pounds of diethanolamine and maintained under a nitrogen atmosphere at a temperature not higher than 122° F. as 159 pounds of 37% aqueous formaldehyde were added. The charge was heated to 203° F. and digested at this temperature until reaction was complete; it was then vacuum-stripped to a water content of 0.2–0.15 weight percent.

The resulting product was transferred to a high pressure reactor to which there was added at 203–235° F. a quantity of propylene oxide sufficient to combine three mols into the nonylphenol-diethylamine-formaldehyde condensation product. This usually requires between about 23.2 and 27.3 pounds of propylene oxide.

After completion of the propylene oxide reaction the crude product was vacuum-stripped to remove unreacted propylene oxide and other volatile materials. The resulting product was a clear reddish-brown liquid having a hydroxyl number of 440 minimum and 460 maximum and a viscosity of 30,000 minimum and 45,000 maximum cps. at 25° C.

The following example shows the advantages of the polyols of our presently-claimed invention when incorporated into rigid polyurethane foams.

EXAMPLE 5

Rigid polyurethane foams were prepared from the Mannich polyols of Examples 2 and 3 by the use of the one-shot technique. The formulations employed and the results obtained are set forth in Table 1. All of the ingredients except the isocyanate were mixed together and then added to the isocyanate. The final mixture was stirred at 4,200 rpm. for 10 seconds and then poured into a 6" × 6" × 12" open mold. The foams were oven cured for one hour at 70° C.

TABLE 1

| Formulation, parts by weight | A | B | C |
|---|---|---|---|
| Polymethylene polyphenylisocyanate | 214 | 214 | 143 |
| Polyol of Example 2 | 157 | 157 | — |
| Polyol of Example 3 | — | — | 100 |
| Blowing agent | 56 | 56 | 50 |
| Foam stabilizer | 7 | 7 | 7 |
| Fire retardant | — | 20 | — |
| Properties | | | |
| Rise time, sec. | 83 | 100 | 81 |
| Density, lb./ft.$^3$ | 1.97 | 2.18 | 1.73 |
| Compressive strength, lb./in.$^2$ | 40.2 | 42.8 | 14.1 |
| Tensile strength, lb./in.$^2$ | 56.9 | 62.1 | 35.6 |
| Burning rate, ASTM 1692-59T | non-burning | non-burning | |

It can be seen from Table 1 that rigid polyurethane foams with good properties can be prepared from the instant polyols by the one-shot method. All the formulations gave rapid rise times but foams A and B have better dimensional strength than foam C. The addition of an extraneous fire retardant to formulation B did not adversely affect the foam properties. Both foams A and B were nonburning.

The heat distortion point as used herein is defined as the temperature at which the compressive strength at 10% compression, measured parallel to the foam rise, is 10% of the normal compressive strength.

The above results show that the polyol of Example 2, which contained two mols of combined propylene oxide per mol of phenol, produced rigid polyurethane foams which had much better properties than those prepared from the polyol of Example 3. In particular, there was a significant improvement in dimensional strength, heat distortion temperature and compressive strength. Foam B shows that the addition of 20% of fire retardant did not adversely affect the final properties of the foam.

What we claim is:

1. A water-insoluble polyol having the property of self-catalyzing reaction with organic polyisocyanates to form rigid polyurethane foam said polyol having the formula

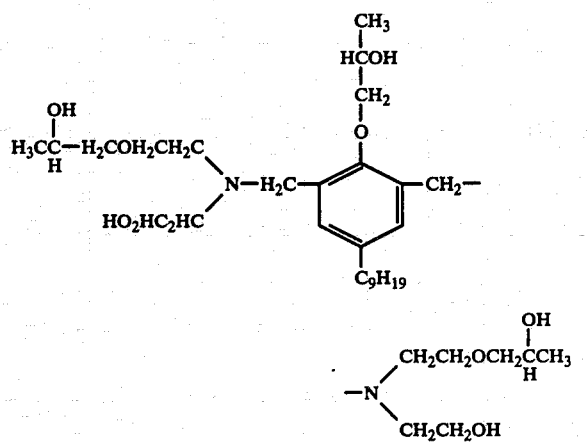

* * * * *